(12) United States Patent
Barsness et al.

(10) Patent No.: US 10,628,288 B2
(45) Date of Patent: Apr. 21, 2020

(54) DEBUGGER THAT CORRELATES DIFFERING VALUES TO SYSTEM ENVIRONMENTS IN A DISTRIBUTED SYSTEM

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 15/217,310

(22) Filed: Jul. 22, 2016

(65) Prior Publication Data
US 2018/0024908 A1  Jan. 25, 2018

(51) Int. Cl.
*G06F 11/36* (2006.01)
(52) U.S. Cl.
CPC ................. *G06F 11/3636* (2013.01)
(58) Field of Classification Search
CPC .................................................. G06F 11/3636
See application file for complete search history.

(56) References Cited

U.S. PATENT DOCUMENTS

| | | | |
|---|---|---|---|
| 8,261,047 B2 | 9/2012 | Moyer et al. | |
| 8,549,320 B2 | 10/2013 | Buettner | |
| 8,572,577 B2 | 10/2013 | Bates et al. | |
| 8,954,932 B2 | 2/2015 | Bates et al. | |
| 9,086,969 B2 | 7/2015 | Bekiroglu et al. | |
| 9,262,300 B1* | 2/2016 | Haba | G06F 11/362 |
| 2005/0086457 A1* | 4/2005 | Hohman | G06F 8/65 713/1 |

(Continued)

OTHER PUBLICATIONS

Disclosed Anonymously, "Method and System for Toggling Breakpoint Automatically in Debugger", IP.com Prior Art Database Technical Disclosure, IPCOM000201674D, Nov. 18, 2010.

(Continued)

*Primary Examiner* — Viva Miller
(74) *Attorney, Agent, or Firm* — Martin & Associates, LLC; Derek P. Martin

(57) ABSTRACT

A debugger for distributed software running on multiple computer systems analyzes and compares system environments for the multiple computer systems. When a breakpoint occurs, or when a failure in one of the computer systems occurs, the debugger determines when one or more values of interest in the distributed software differ among the different computer systems. The debugger then determines whether the one or differing values correlate to the system environment for the corresponding computer systems. When the one or more differing values correlate to the system environment for the corresponding computer systems, the user of the debugger is notified of the correlation between the differing values and the system environments of the computer systems, to help potentially identify differences in system environments that could be contributing to the differing values.

18 Claims, 6 Drawing Sheets

(56) References Cited

U.S. PATENT DOCUMENTS

| | | | |
|---|---|---|---|
| 2007/0168968 A1* | 7/2007 | Bates | G06F 11/3632 |
| | | | 717/124 |
| 2008/0307397 A1 | 12/2008 | Angell | |
| 2009/0320001 A1* | 12/2009 | Bates | G06F 11/3636 |
| | | | 717/129 |
| 2017/0109251 A1* | 4/2017 | Das | G06F 11/3017 |

OTHER PUBLICATIONS

Zhang et al., "BPGen: An Automated Breakpoint Generator for Debugging", Proceedings of the 32nd ACM/IEEE International Conference on Software Engineering, vol. 2, pp. 271-274 (2010).

* cited by examiner

```
1.    new_keys = ["second", "third", "first"]
2.    new_dict = {}
3.    my_dict = {"first": 1, "second":2, "third":3 }
4.    idx = 0
5.    for k, v in my_dict.items():
6.        print k + ', ' + str(v)
7.        new_dict[new_keys[idx]] = v
8.        idx += 1
9.    print "New dictionary"
10.   for k, v in new_dict.items():
11.       print k + ', ' + str(v)
```

FIG. 7 second, 2
third, 3
first, 1
New dictionary
second, 2
third, 3
first, 1

FIG. 8 first, 1
second, 2
third, 3
New dictionary
second, 1
third, 2
first, 3

FIG. 9 idx = 0
new_key[idx] = "second"
v = 2

FIG. 10 idx = 0
new_key[idx] = "second"
v = 1

DEBUGGER THAT CORRELATES DIFFERING VALUES TO SYSTEM ENVIRONMENTS IN A DISTRIBUTED SYSTEM

BACKGROUND

1. Technical Field

This disclosure generally relates to debugging software, and more specifically relates to debugging software in a distributed system that includes multiple computer systems.

2. Background Art

Computer systems have evolved into extremely sophisticated devices, and may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modern programming environments include a debugger that provides tools for testing and debugging a computer program.

Distributed systems may include multiple computer systems working together. In a distributed system, debugging software becomes even more difficult, because the different system environments on the multiple computer systems can cause problems that are hard to catch with traditional debuggers.

BRIEF SUMMARY

A debugger for distributed software running on multiple computer systems analyzes and compares system environments for the multiple computer systems. When a breakpoint occurs, or when a failure in one of the computer systems occurs, the debugger determines when one or more values of interest in the distributed software differ among the different computer systems. The debugger then determines whether the one or differing values correlate to the system environment for the corresponding computer systems. When the one or more differing values correlate to the system environment for the corresponding computer systems, the user of the debugger is notified of the correlation between the differing values and the system environments of the computer systems, to help potentially identify differences in system environments that could be contributing to the differing values.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is a snippet of pseudo-code for illustrating one specific example;

FIG. 8 shows the result of running the code in FIG. 7 on systems 1, 4 and 5 in FIG. 6;

FIG. 9 shows the result of running the code in FIG. 7 on systems 2 and 3 in FIG. 6;

Figure 6:
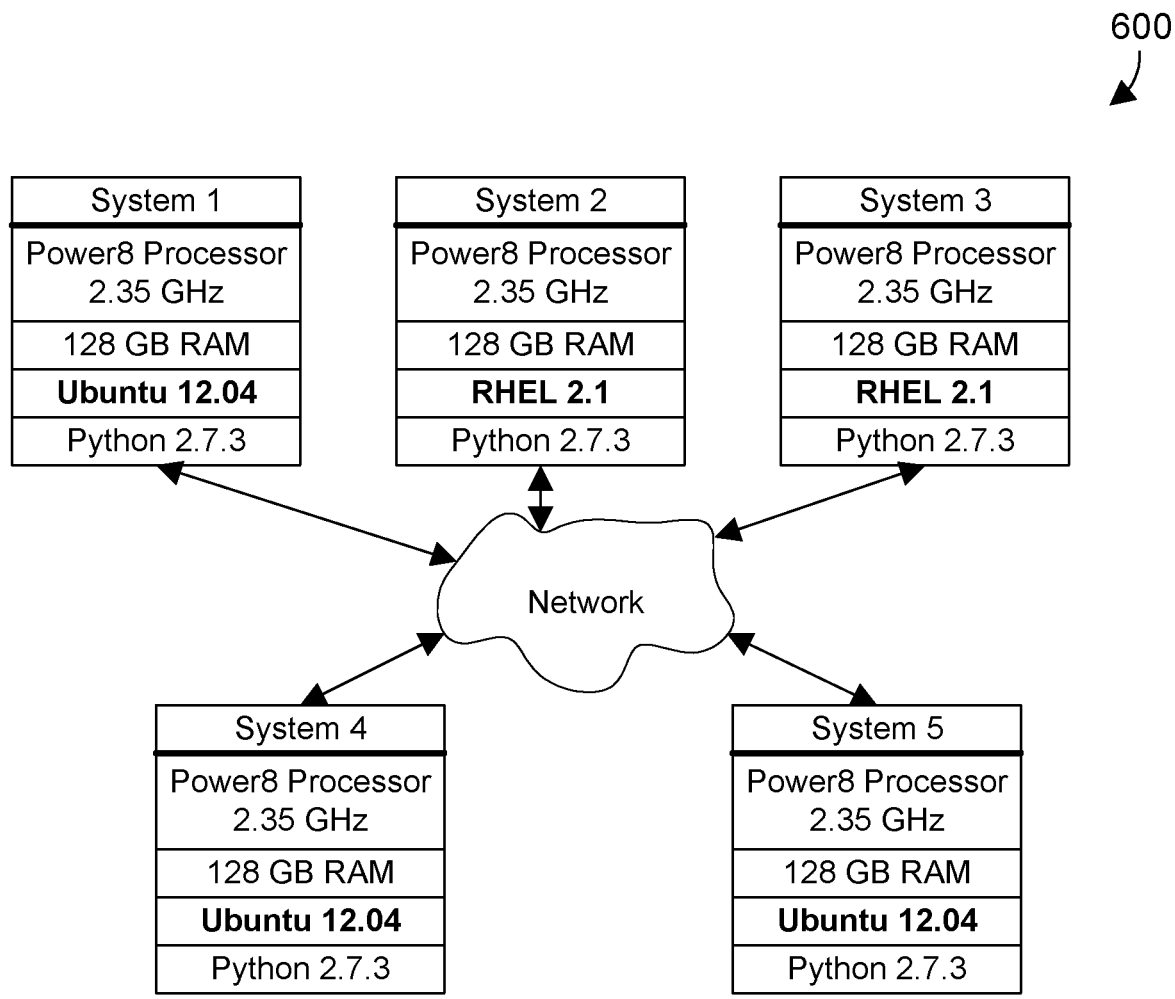
FIG. 6 is a block diagram showing one simplified example for illustrating the concepts herein.

FIG. 10 shows values of three variables in the code in FIG. 7 on systems 1, 4 and 5 in FIG. 6 when a breakpoint at instruction 7 is hit; and FIG. 11 shows values of the three variables in the code in FIG. 7 on systems 2 and 3 in FIG. 6 when a breakpoint at instruction 7 is hit.

DETAILED DESCRIPTION

The disclosure and claims herein are directed to a debugger for distributed software running on multiple computer systems that analyzes and compares system environments for the multiple computer systems. When a breakpoint occurs, or when a failure in one of the computer systems occurs, the debugger determines when one or more values of interest in the distributed software differ among the different computer systems. The debugger then determines whether the one or differing values correlate to the system environment for the corresponding computer systems. When the one or more differing values correlate to the system environment for the corresponding computer systems, the user of the debugger is notified of the correlation between the differing values and the system environments of the computer systems, to help potentially identify differences in system environments that could be contributing to the differing values.

Figure 1:
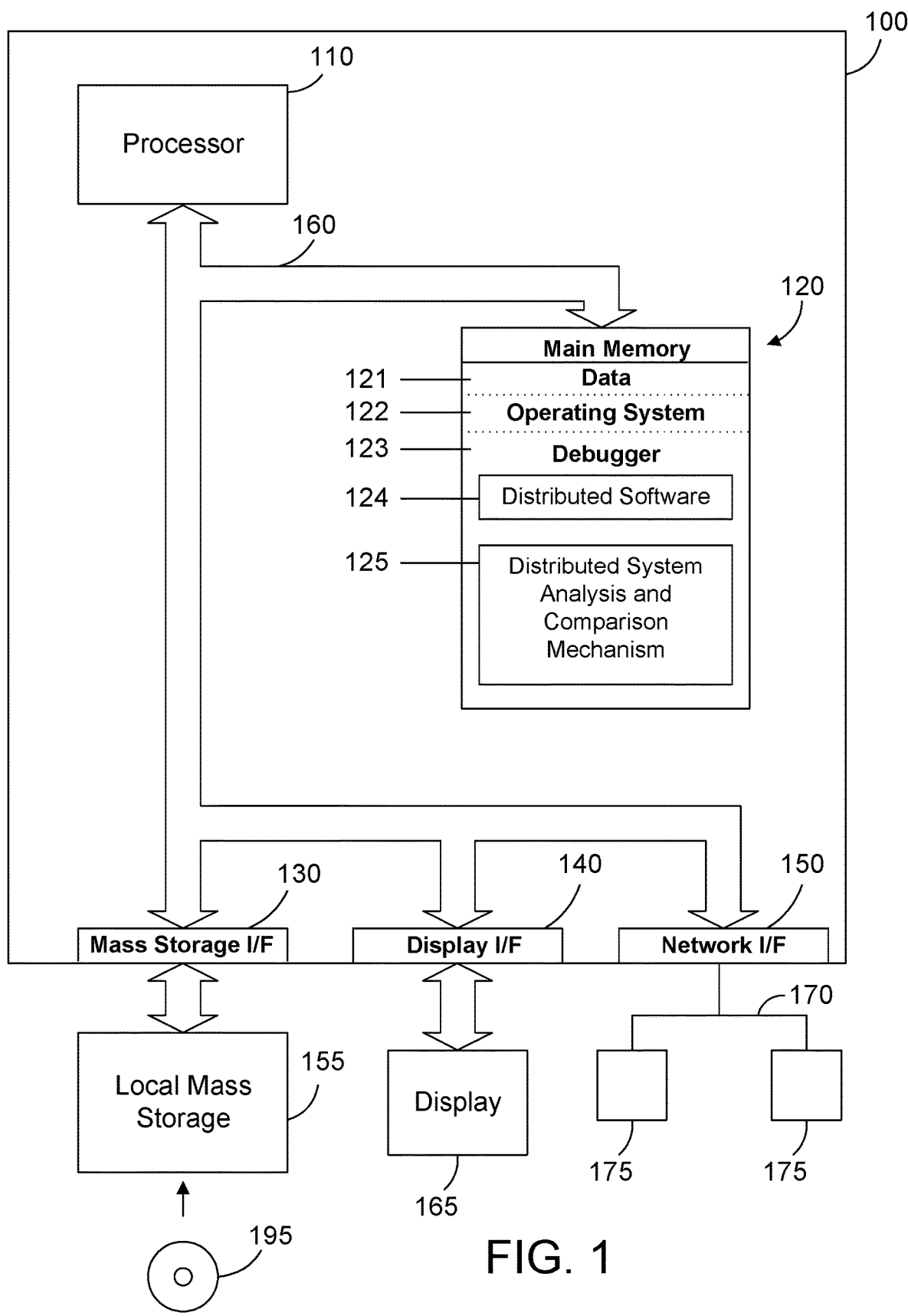
FIG. 1 is a block diagram of a computer system that includes a debugger that determines whether one or more differing values of interest have a correlation to system environment in multiple computer systems.

Referring to FIG. 1, a computer system 100 is one suitable implementation of a computer system that includes a debugger that analyzes and compares system environments of distributed systems as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such a thumb drive.

Main memory 120 preferably contains data 121, an operating system 122, and a debugger 123. Data 121 represents any data that serves as input to or output from any program in computer system 100. Operating system 122 is a multi-tasking operating system, such as AIX or LINUX. Debugger 123 is preferably a debugger that allows debugging software run on a distributed system that includes multiple computer systems, such as distributed software 124. One suitable example of distributed software 124 is a distributed application that runs on multiple computer systems, such as a web server or an OpenStack cloud controller. The debugger 123 includes a distributed system analysis and comparison mechanism 125 that determines system environment for multiple computer systems, analyzes differences between the systems, and determines whether or not there is a correlation between system environment and values of interest read by the debugger at a breakpoint or upon failure of one of the computer systems. When there is a correlation between values of interest read by the debugger and system environments of the multiple computer systems, the debugger 123 notifies the user of the correlation, which can help focus the user's efforts in debugging the distributed software 124.

The term "computer systems" includes any and all combination of hardware and software. In addition, the term "computer systems" may additionally include one or more virtual machines provisioned on one or more physical computer systems. The disclosure and claims herein expressly extend to any system that can be termed a "computer system", which includes any and all systems that have a system environment that can be compared to the system environment of other computer systems.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and debugger 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the debugger 123.

Although computer system 100 is shown to contain only a single processor and a single system bus, those skilled in the art will appreciate that a debugger as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter. The computer systems 175 shown in FIG. 1 could include the computer systems in a distributed system that execute the distributed software 124.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
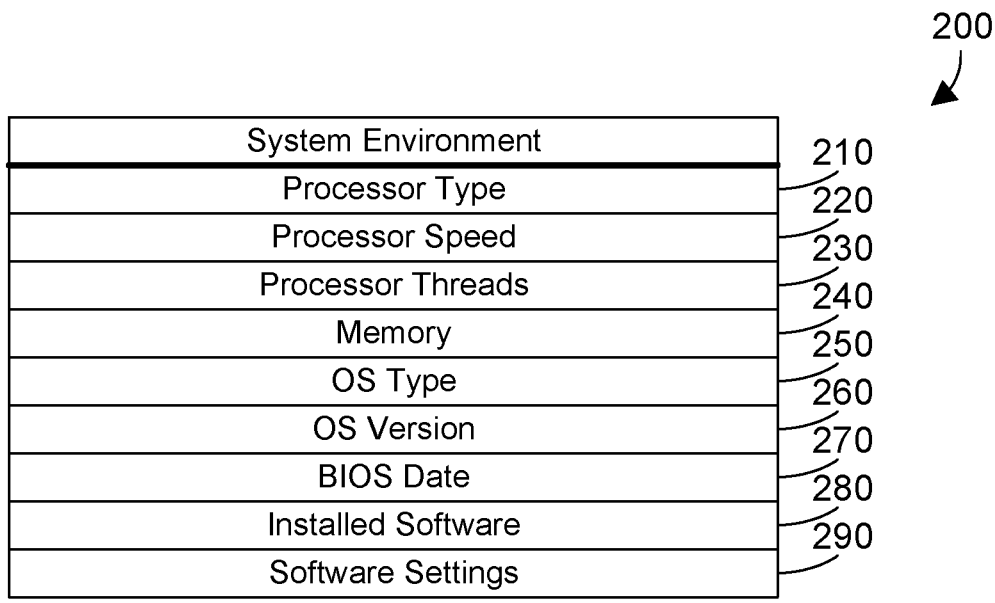
FIG. 2 is a block diagram of a table showing suitable examples of characteristics of a system environment that could be queried by the debugger.

System environment for a computer system can be defined in many ways. FIG. 2 shows a table 200 that includes some examples of characteristics or specifications of a computer system that can define its system environment. The combination of Processor type 210 is preferably part of the system environment. Examples of processor type 210 include x86 processor, Power processor, and ARM processor. Processor speed 220 is preferably part of the system environment, and specifies the clock speed of the processor, such as 2.35 GHz. Processor threads 230 can be part of the system environment for processors that provide simultaneous multithreading (SMT) by providing multiple hardware threads within the processor. Note the processor threads 230 will not be part of the system environment for processors that do not provide multiple hardware threads. Memory 240 is preferably part of the system environment, and specifies the amount of memory on the computer system. Operating system type 250 is preferably part of the system environment. Examples of operating system type 250 include Ubuntu, Red Hat, Suse, Fedora, Microsoft Windows, IBM i and System z. Operating system version 260 is preferably part of the system environment. Operating system version 260 can include the version of the operating system, and may additionally include the kernel version of the operating system. BIOS date 270 is preferably part of the system environment. BIOS date 270 specifies the date of the BIOS (firmware) running on the computer system. Installed software 280 is preferably part of the system environment. Installed software 280 preferably specifies both the name and version of the installed software. Examples of installed software 280 include applications, compilers, libraries, packages, Red Hat package managers (RPMs), etc. Software settings 290 are preferably part of the system environment. Software settings 290 preferably specify any settings relating to software installed on the computer system, including library versions, global database settings, pool sizes, TCP/IP settings, frame settings, buffer size, database settings, system values, etc. The characteristics shown in FIG. 2 are examples of characteristics that can define a system environment, and are shown by way of example. The disclosure and claims herein expressly extend to any suitable characteristics that can be used to define a system environment, whether currently known or developed in the future.

Figure 3:
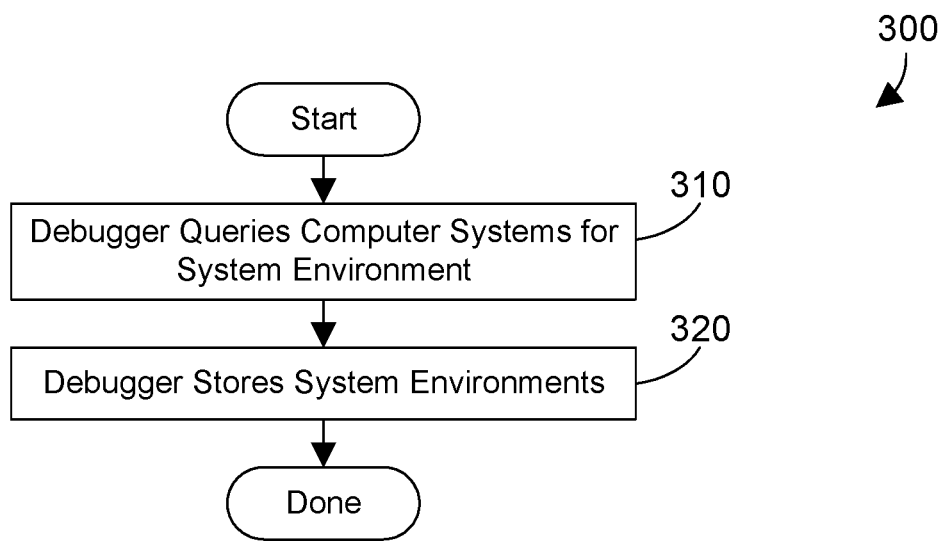
FIG. 3 is a flow diagram of a method for a debugger to query computer systems for their system environments.

FIG. 3 shows a method for the debugger 123 in FIG. 3 to determine system environments for the computer systems executing the distributed software 124. The debugger queries each computer system for its respective system environment (step 310). The debugger then stores the system environments (step 320) so it can use the system environment information to determine correlation between values of interest and system environments, as discussed in more detail below.

Step 310 in FIG. 3 can be performed in different ways. For example, the debugger could query each of the computer systems executing the distributed software when the debugger is initialized, or first starts. This works well when the debugger is used to debug the code shortly after the debugger is initialized. In some circumstances, the debugger may run for a very long time, such as days or weeks. Due to the risk of the system environment on one or more of the computer systems changing between the time the debugger is initialized and the time the debugger is used to debug a problem in the distributed software, the debugger could query the computer systems in step 310 at some point after the debugger is initialized, such as just before running the distributed software, or just after the distributed software is stopped. Of course, a hybrid of these two approaches could also be used. For example, the debugger could query all of the computer systems for their system environment when the debugger is initialized, then query again one or more of the computer systems for any updates to the system environment once the distributed application is stopped. The disclosure and claims herein extend to the debugger querying the computer systems for their system environments at any suitable time, or at multiple times.

Figure 4:
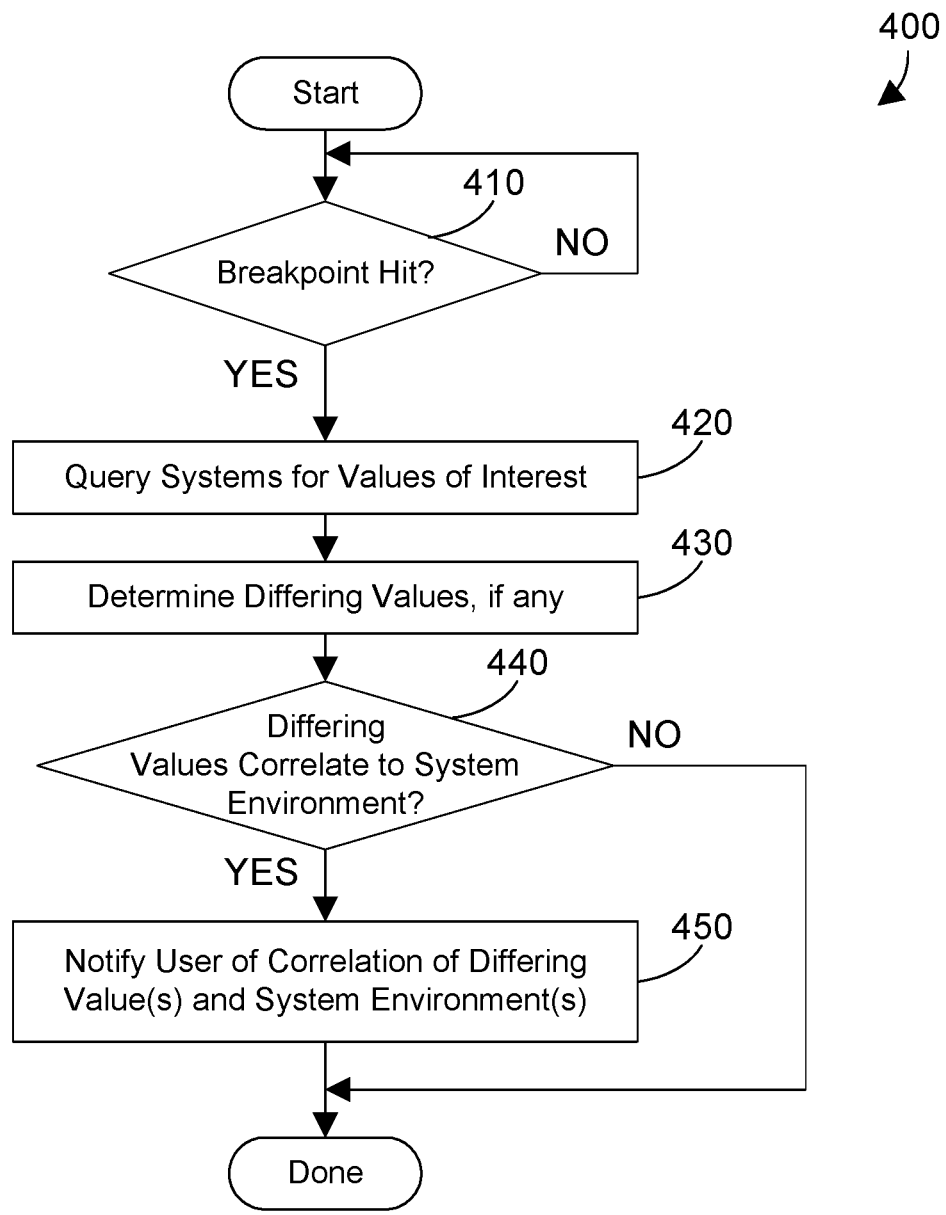
FIG. 4 is a flow diagram of a method for indicating a correlation of differing value(s) to system environment(s) when a breakpoint is hit.

Referring to FIG. 4, method 400 is preferably performed by the debugger 123 shown in FIG. 1 when the debugger is executing the distributed software 124 and waiting to hit a breakpoint (step 410). As long as no breakpoint is hit (step 410=NO), method 400 loops back to step 410 until a breakpoint is hit (step 410=YES). Hitting the breakpoint results in the debugger stopping the execution of the distributed software so one or more values can be inspected in one or more of the computer systems to determine whether the values are as expected. The debugger queries one or more systems for one or more values of interest (step 420). Examples of values of interest can include contents of registers, contents of memory locations, and values of variables in the distributed software. Next, the debugger determines if there are differing values between the computer systems that were executing the distributed software (step 430). For example, if one computer system has one value for a variable and a different computer system has a different value for the same variable at the same point in time, these two values for the same variable are differing values in step 430. When the differing values do not correlate to the different system environments (step 440=NO), method 400 is done. When the differing values correlate to the different system environments (step 440=YES), the user is notified of the correlation of the differing values and the different system environments (step 450). Method 400 is then done.

Figure 5:
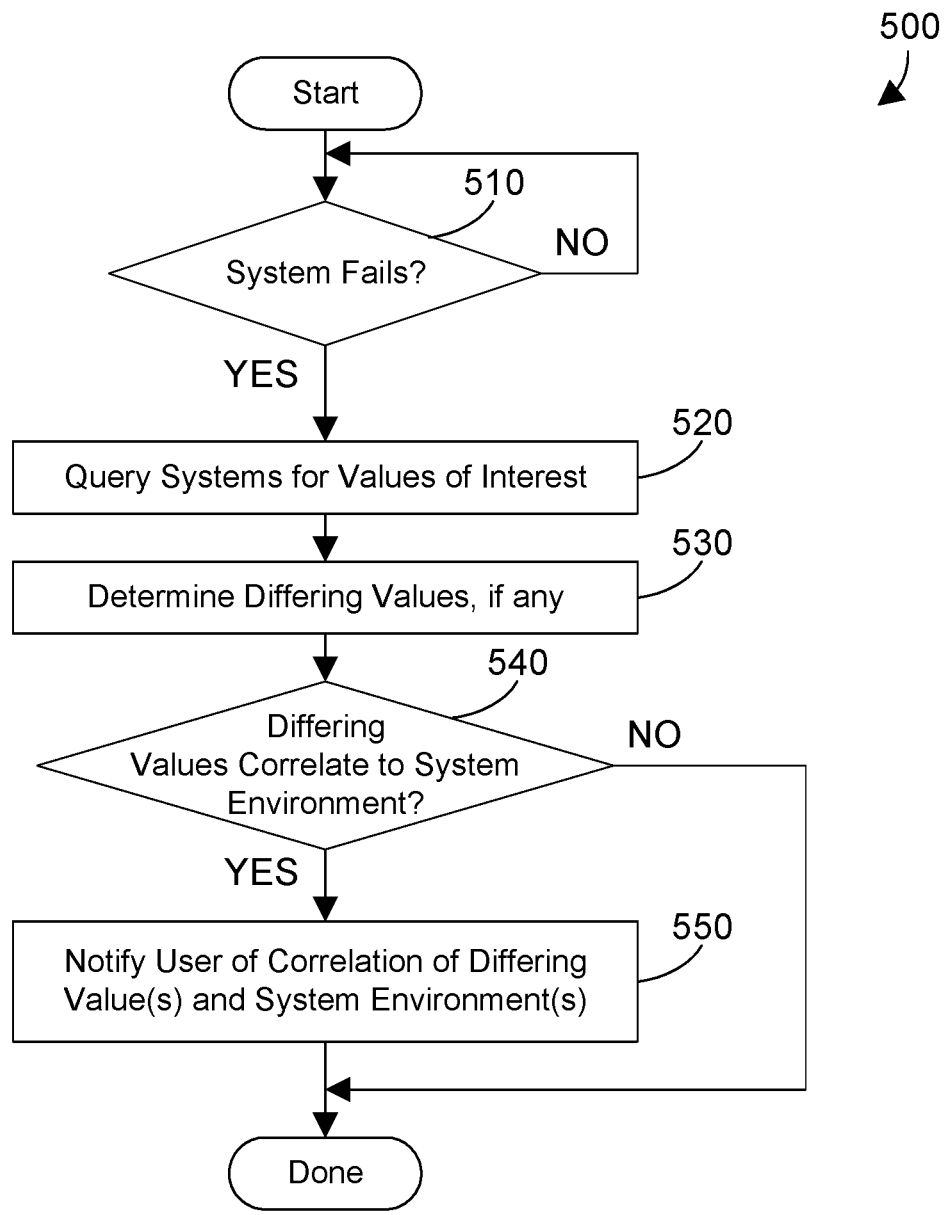
FIG. 5 is a flow diagram of a method for indicating a correlation of differing value(s) to system environment(s) when one of the computer systems in a distributed environment crashes.

FIG. 5 shows a method 500 that is similar in some respects to method 400 in FIG. 4. Method 500 is preferably performed by the debugger 123 shown in FIG. 1 when the debugger is executing the distributed software 124 and when the debugger detects that one of the computer systems fails (step 510=YES). When one of the computer system fails, the debugger stops execution of the distributed software so one or more values can be inspected in one or more of the computer systems to determine whether the values are as expected. The debugger queries one or more systems for one or more values of interest (step 520). Next, the debugger determines if there are differing values between the computer systems that were executing the distributed software (step 530). When the differing values do not correlate to the different system environments (step 540=NO), method 500 is done. When the differing values correlate to the different system environments (step 540=YES), the user is notified of the correlation of the differing values and the different system environments (step 550). Method 500 is then done.

A simple example is provided in FIGS. 6-11 to illustrate the general concepts of the debugger discussed herein. Referring to FIG. 6, a distributed system 600 includes five separate computer systems, shown in FIG. 6 as System 1, System 2, System 3, System 4 and System 5, all interconnected via some network. The network could be a local area network, a wide area network, the Internet, or any combination of these, including Wi-Fi, Li-Fi, Blue Tooth, virtual networks, etc. For this very simplified example, the system environment for these five computer systems in FIG. 6 is identical except for the operating system type and version, as shown in bold in each of the five systems. Systems 1, 4 and 5 run Ubuntu version 12.04, while System 2 and System 3 run Red Hat (RHEL) version 2.1.

We assume the distributed software being debugged includes the code shown in FIG. 7. This example highlights known differences of how operating systems handle libraries and dictionaries that can produce differences (bugs) in how distributed software runs on different computer systems. When the code in FIG. 7 is run on Systems 1, 4 and 5 in FIG. 6, which run the Ubuntu operating system, the output of the code is as shown in FIG. 8. When the same code in FIG. 7 is run on Systems 2 and 3 in FIG. 6, which run the Red Hat operating system, the output of the code is as shown in FIG. 9. Note the differences between the outputs in FIGS. 8 and 9, which are caused by the differences in how dictionaries and libraries are handled.

As a result of these different outputs in FIGS. 8 and 9, we assume the user of the debugger sets a breakpoint at instruction 7 in the code in FIG. 7. When the debugger hits the breakpoint at instruction 7 (step 410=YES in FIG. 4), the debugger stops the execution of the distributed software. The user can then query the computer systems for values of interest (step 420 in FIG. 4). We assume the values of interest for this example are the values of the variable idx, the value of the variable new_key[idx], and the value of the variable v. FIG. 10 shows the values for these three variables retrieved from Systems 1, 4 and 5. FIG. 11 shows the values for these three variables retrieved from System 2 and 3. As can be seen from FIGS. 10 and 11, the difference in these variable is that variable v has a value of 2 in FIG. 10 and a value of 1 in FIG. 11. These differing values are determined in step 430 in FIG. 4. The differing values correlate to the system environments (step 440=YES), because Systems 1, 4 and 5 that run Ubuntu have a value of 2 for variable v while systems 2 and 3 that run RHEL have a value of 1 for variable v. As a result, the user of the debugger is notified of the correlation of the differing values and the system environments (step 450 in FIG. 4), which means for this specific example the user will be prompted that systems that run Ubuntu (namely, Systems 1, 4 and 5) have a value of v=2 while systems that run Red Hat (namely, Systems 2 and 3) have a value of v=1. This information can prompt the user to investigate whether the difference in system environments could be causing or contributing to the difference in values, thereby enhancing the user's ability to debug the distributed software. The debugger thus provides enhanced functionality by correlating differences in values in distributed software with differences in the system environments of the different computer systems.

A debugger for distributed software running on multiple computer systems analyzes and compares system environments for the multiple computer systems. When a breakpoint occurs, or when a failure in one of the computer systems occurs, the debugger determines when one or more values of interest in the distributed software differ among the different computer systems. The debugger then determines whether the one or differing values correlate to the system environment for the corresponding computer systems. When the one or more differing values correlate to the system environment for the corresponding computer systems, the user of the debugger is notified of the correlation between the differing values and the system environments of the computer systems, to help potentially identify differences in system environments that could be contributing to the differing values.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a network interface coupled to the at least one processor that connects the apparatus to a plurality of computer systems; and
   a debugger residing in the memory and executed by the at least one processor, the debugger executing distributed software that runs on the plurality of computer systems, the debugger querying the plurality of computer systems to determine a system environment of each of the plurality of computer systems, wherein the system environment includes specifications for processor type, processor speed and processor threads, querying at least one value of interest in the distributed software when execution of the distributed software is stopped, determining when the at least one value of interest differs between the plurality of computer systems, determining when the at least one value of interest that differs correlates to the processor type, processor speed and processor threads of the plurality of computer systems, and in response, notifying a user of the debugger regarding the correlation of the at least one value of interest that differs to the processor type, processor speed and processor threads of the plurality of computer systems.

2. The apparatus of claim 1 wherein the system environment includes specifications for memory, operating system type, and operating system version.

3. The apparatus of claim 1 wherein the system environment includes specifications for installed software and settings for the installed software.

4. The apparatus of claim 1 wherein the execution of the distributed software is stopped by the debugger in response to the debugger hitting a breakpoint.

5. The apparatus of claim 1 wherein the execution of the distributed software is stopped by the debugger in response to the debugger detecting at least one of the plurality of computer systems failed.

6. The apparatus of claim 1 wherein the debugger queries the plurality of computer systems to determine the system environment of each of the plurality of computer systems when the debugger is initialized.

7. The apparatus of claim 6 wherein the debugger further queries at least one of the plurality of computer systems to determine the system environment of the at least one computer system when execution of the distributed software is stopped.

8. The apparatus of claim 1 wherein the debugger queries the plurality of computer systems to determine the system environment of each of the plurality of computer systems when execution of the distributed software is stopped.

9. A computer-implemented method executed by at least one processor for a debugger to debug distributed software executing on a plurality of computers systems, the method comprising:
   querying the plurality of computer systems to determine a system environment of each of the plurality of computer systems, wherein the system environment includes specifications for processor type, processor speed and processor threads;
   querying at least one value of interest in the distributed software when execution of the distributed software is stopped;
   determining when the at least one value of interest differs between the plurality of computer systems; and
   determining when the at least one value of interest that differs correlates to processor type, processor speed and processor threads of the plurality of computer systems, and in response, notifying a user regarding the correlation of the at least one value of interest that differs to the processor type, processor speed and processor threads of the plurality of computer systems.

10. The method of claim 9 wherein the system environment includes specifications for memory, operating system type, and operating system version.

11. The method of claim 9 wherein the system environment includes specifications for installed software and settings for the installed software.

12. The method of claim 9 wherein the execution of the distributed software is stopped in response to the debugger hitting a breakpoint.

13. The method of claim 9 wherein the execution of the distributed software is stopped by the debugger in response to the debugger detecting at least one of the plurality of computer systems failed.

14. The method of claim 9 further comprising the debugger querying the plurality of computer systems to determine the system environment of each of the plurality of computer systems when the debugger is initialized.

15. The method of claim 14 further comprising the debugger querying at least one of the plurality of computer systems to determine the system environment of the at least one computer system when execution of the distributed software is stopped.

16. The method of claim 9 further comprising the debugger querying the plurality of computer systems to determine the system environment of each of the plurality of computer systems when execution of the distributed software is stopped.

17. A computer-implemented method executed by at least one processor for a debugger to debug distributed software executing on a plurality of computers systems, the method comprising:
   upon initialization of the debugger, querying the plurality of computer systems to determine a system environment of each of the plurality of computer systems, wherein the system environment comprises:
      processor type;
      processor speed;
      processor threads;
      memory;
      operating system type;
      operating system version;
      installed software; and
      settings for the installed software;
   querying at least one value of interest in the distributed software when execution of the distributed software is stopped;
   once the distributed software is stopped, querying at least one of the plurality of computer systems to determine the system environment;
   determining when the at least one value of interest differs between the plurality of computer systems; and
   determining when the at least one value of interest that differs correlates to the system environment of the plurality of computer systems, and in response, notifying a user regarding the correlation of the at least one value of interest that differs to the system environment of the plurality of computer systems.

18. The method of claim 17 wherein the execution of the distributed software is stopped in response to the debugger hitting a breakpoint or in response to the debugger detecting one of the plurality of computer systems failed.

* * * * *